United States Patent [19]

Salkeld

[11] Patent Number: 4,987,419
[45] Date of Patent: Jan. 22, 1991

[54] STABILIZING AIR TO GROUND RADAR

[75] Inventor: Geoffrey Salkeld, Lancashire, England

[73] Assignee: British Aerospace Public Limited Company, London, England

[21] Appl. No.: 198,682

[22] Filed: May 24, 1988

Related U.S. Application Data

[63] Continuation of Ser. No. 27,894, Mar. 19, 1987, abandoned.

[30] Foreign Application Priority Data

Mar. 20, 1986 [GB] United Kingdom ............... 8606978

[51] Int. Cl.⁵ .............................................. G01S 13/94
[52] U.S. Cl. ......................................... 342/75; 342/62
[58] Field of Search .................... 342/62, 63, 65, 75

[56] References Cited

U.S. PATENT DOCUMENTS

| | | | |
|---|---|---|---|
| 3,210,760 | 10/1965 | Olson et al. | 342/65 X |
| 3,321,761 | 5/1967 | Biagi et al. | 342/75 X |
| 3,404,398 | 10/1968 | Hoban et al. | 342/65 |
| 3,533,105 | 10/1970 | Sharp | 342/65 |
| 3,553,688 | 1/1971 | Bechtel . | |
| 3,553,689 | 1/1971 | Bechtel | 342/65 |
| 3,568,187 | 3/1971 | Bechtel et al. | 342/65 |
| 3,680,094 | 7/1972 | Bayle et al. . | |
| 3,706,988 | 12/1972 | Bayle et al. . | |
| 3,739,380 | 6/1973 | Burdic et al. . | |
| 3,740,750 | 6/1973 | Moulton | 342/65 X |
| 3,795,909 | 3/1974 | Vehrs, Jr. . | |
| 3,810,175 | 5/1974 | Bell . | |
| 3,815,132 | 6/1974 | Case, Jr. et al. . | |
| 3,949,955 | 4/1976 | Sykes et al. | 342/62 X |
| 4,024,537 | 5/1977 | Hart . | |
| 4,144,571 | 3/1979 | Webber . | |
| 4,152,703 | 5/1979 | Ziemke et al. | 342/432 |
| 4,190,837 | 2/1980 | Salvaudon et al. . | |
| 4,194,204 | 3/1980 | Alpers . | |
| 4,346,595 | 8/1982 | Gary | 342/26 X |
| 4,347,511 | 8/1982 | Hoffmann et al. | 342/64 |
| 4,442,431 | 4/1984 | Bleakney | 342/62 |
| 4,486,756 | 12/1984 | Peregrim et al. | 342/62 X |
| 4,507,663 | 3/1985 | Mori et al. | 342/440 |
| 4,562,439 | 12/1985 | Peralta et al. | 342/81 |
| 4,630,050 | 12/1986 | Johnson | 342/62 |
| 4,646,244 | 2/1987 | Bateman et al. | 342/65 X |
| 4,665,401 | 5/1987 | Garrard et al. | 342/75 |
| 4,724,437 | 2/1988 | Jones et al. | 342/101 |
| 4,752,779 | 6/1988 | Jones et al. | 342/80 |
| 4,760,396 | 7/1988 | Barney et al. | 342/65 |
| 4,760,397 | 7/1988 | Piccoiruaz | 342/75 |
| 4,803,490 | 2/1989 | Kruger | 342/158 |
| 4,825,055 | 4/1989 | Pollock | 342/75 X |
| 4,843,398 | 6/1989 | Houston | 342/74 |

*Primary Examiner*—Barrón, Jr. Gilberto
*Assistant Examiner*—John B. Sotomayor
*Attorney, Agent, or Firm*—Cushman, Darby & Cushman

[57] ABSTRACT

Air-to-ground radar (2) is stabilized by comparing the power of the returning echo occurring during an initial period after the transmission of each pulse with that occurring during a following period after the transmission of each pulse, and using the result of this comparison to control an elevation controller (13) of the radar (2). Means (7, 8) provide a first power signal representative of the power of the returning echo occurring during an initial period after the transmission of each pulse, means (7, 9, 10) provide a second power signal representative of the power of the returning echo occurring during a following period after the transmission of each pulse, and a comparator (12) compares the magnitude of the first and second power signals and outputs a control signal causing the elevation controller (13) to raise or lower the elevation at which output pulses are projected.

12 Claims, 2 Drawing Sheets

STABILIZING AIR TO GROUND RADAR

BACKGROUND TO THE INVENTION

Large beam width airborne radar or long range radar used in an air-to-ground mode normally has its elevation stabilized by mounting the radar on a platform which is stabilized with an inertial reference. However, with narrow beam width, short range air-to-ground radar it is desirable to be able to follow the contour of the ground over which the aircraft is flying.

STATEMENTS OF INVENTION

According to a first aspect of this invention a method of stabilizing the elevation of an air-to-ground radar comprises comparing the power of the returning echo occurring during an initial period after the transmission of each pulse with that occurring during a following period after the transmission of each pulse, and using the result of this comparison to control the elevation of the radar.

By comparing the power of the returning echo which occurs during an initial period with that which occurs during a following period a comparison is obtained between signals from a near range and signals from a far range. Somewhat surprisingly we have found that as the elevation of the transmitted beam changes from being correct to being too great the comparison between the signals from the near range and those from the far range changes by the signals from the far range becoming predominant. Conversely if the elevation changes to being too little the signals from the near range become predominant.

According to another aspect of this invention an air-to-ground radar includes an elevation controller to control the elevation at which output pulses are projected, means to provide a first power signal representative of the power of the returning echo occurring during an initial period after the transmission of each pulse, means to provide a second power signal representative of the power of the returning echo occurring during a following period after the transmission of each pulse, and a comparator to compare the magnitude of the first and second power signals and output a control signal which causes the elevation controller to raise or lower the elevation at which output pulses are projected in accordance with the result of the comparison.

The use of the present invention to replace a conventional gyro stabilizing system including an inertial reference produces a more effective, lighter and very much cheaper system.

The power of the return echo is, in general, proportional to the inverse of the range of its travel to the power four i.e. $P \alpha 1/R^4$ and thus the absolute power level of the far range or second signal is generally lower than that of the near range or first signal. The simplest way to take account of this is for the apparatus to include an amplifier to amplify the second power signal to compensate for the greater loss to be expected from the echoes returning from the far range. In spite of this general power relationship between power and range of travel we have found that over small variations if the elevation is too high the comparison between the first and second signals leads to the second signal predominating whereas if the elevation is too low the comparison between the first and second signals leads to the first signal predominating. Of course if a large variation exists, for example if the elevation is much too great so that it points skywards substantially no return echo is received.

Preferably the radar also includes biasing means to cause the elevation controller to lower the elevation at which output pulses are projected in the absence of both the first and second power signals. The biasing means thus takes account of a situation where the transmitted radar pulse is directed skywards away from the ground and so results in no echoes returning during either the initial or the following period. Preferably the apparatus includes an operational amplifier having the second power signal connected to one of its input terminals and an offset voltage connected to another of its input terminals having the same sense. This operational amplifier then firstly amplifies the second power signal to compensate for the loss of power returned from the far range and also provides the biasing means. Preferably both the first and second power signals are averaged by passage through low pass filters before they are compared in the comparator.

BRIEF DESCRIPTION OF THE DRAWINGS

A particular example of a method and apparatus in accordance with this invention will now be described with reference to the accompanying drawings; in which.

DESCRIPTION OF A PREFERRED EXAMPLE

Figure 1:
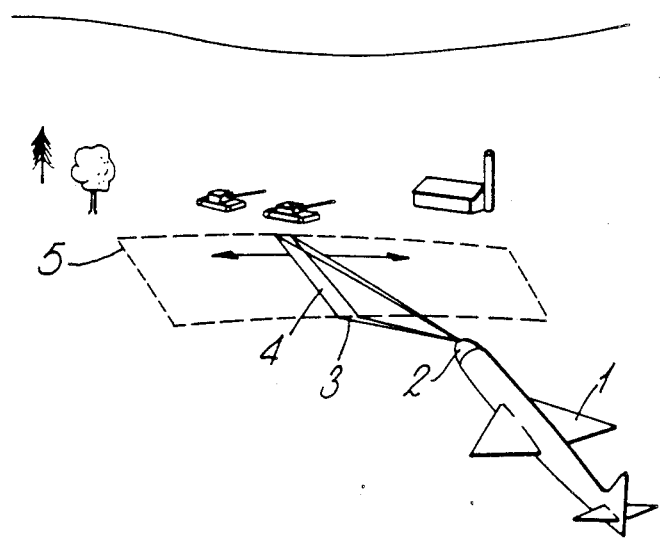
FIG. 1 is a perspective view showing the overall arrangement of an air-to-ground radar system.

This example of the present invention is used with continuously scanning radar apparatus in the millimetric waveband (MMW). MMW radar is an alternative to an infra red surveillance system and has advantages over such systems in that it is less affected by weather, it can readily provide information such as range, and it can also provide motion detection. Such radar provides adequate resolution and avoids the need for specialist personnel to distinguish and interpret the radar signature of a vehicular target from the normal background clutter of the signal return.

An aircraft 1 includes the MMW radar apparatus 2 which transmits a pulsed beam 3 of narrow azimuth included angle of 0.5 degrees and an elevation included angle of between 0.75 degrees and 2.0 degrees. The radar apparatus 2 operates at between 60 and 300 GHz and typically at 94 GHz. At a typical low level incursion height the apparatus provides ground coverage of a patch 4 measuring 60 meters in range extent by 25 meters in cross-range extent. The radar is scanned laterally between ±30 degrees from head on to cover, on one sweep, the ground area 5 shown in dotted lines of 600 meters by 3 kilometers in a period of 1 second. The pulses are 75 ns in width and have a repetition frequency of 40 KHz. The frequency of the transmitted beam is preferably varied throughout a range of frequencies over a sequence of pulses in the period of beam dwell during the scanning as an aid to target discrimination.

Figure 2:
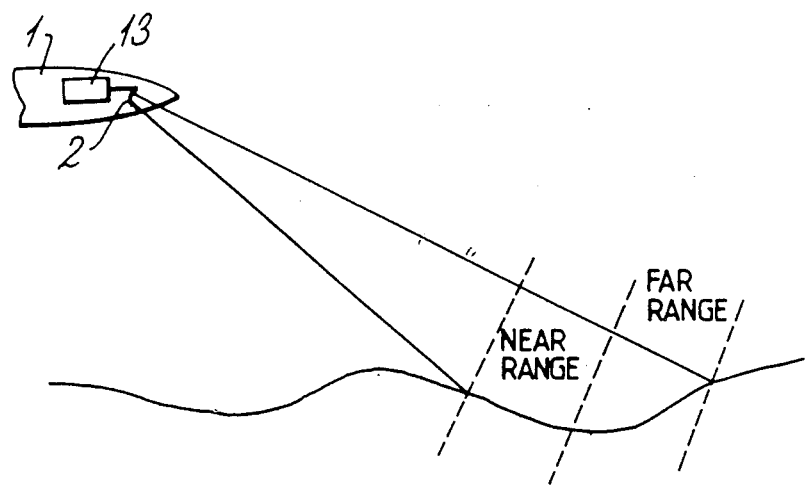
FIG. 2 is a side elevation illustrating the radar system.
Figure 3:
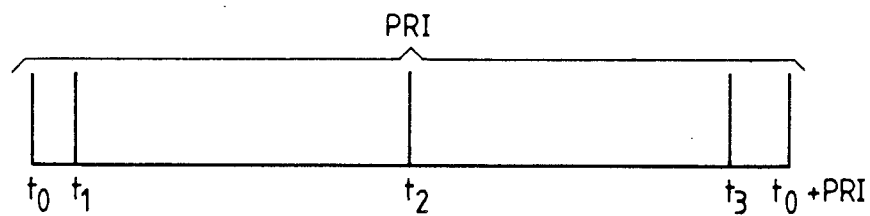
FIG. 3 is a timing diagram of the system.
Figure 4:
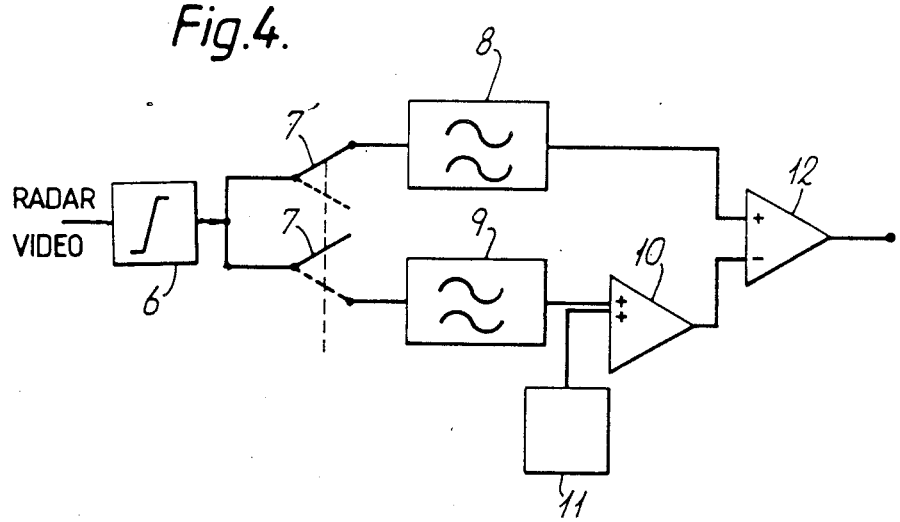
FIG. 4 is a circuit diagram of part of the system.

The present invention relates to a method of controlling the angle of elevation of such a system to maintain the system at the correct depression angle for the inclination of the local terrain. To enable it to do this, the radar beam as shown in FIG. 2, is notionally divided into a far range and a near range beam. This is achieved by dividing the period for which the returned radar echoes are monitored into two separate regions. Considering the timing diagram shown in FIG. 3, at time $t_0$ a radar pulse is transmitted. At time $t_1$ the spillover from this transmission pulse has subsided in the video receiver and an initial timing period commences and continues until time $t_2$. Time $t_2$ is the time at which an echo should be returning to the radar from a target at the ideal range. Time $t_3$ is the effective end of the timing period and just before the next radar pulse to be transmitted has any effect on the transceiver. At time $t_0$+P.R.I., the pulse repetition interval, the next radar pulse is transmitted and this sequence is repeated throughout the operation of the radar.

The radar echo picked up by the receiver in the aircraft 1 is fed via a limiting amplifier 6 and a cross-over switch 7 to a low pass filter 8 or a low pass filter 9. During an initial timing period defined as being between times $t_1$ and $t_2$ the returned echo signals are fed to the low pass filter 8 whilst during the following time period between times $t_2$ and $t_3$ the signals are applied to low pass filter 9. The output from low pass filter 9 is fed to an operational amplifier 10 in which the output signal from the low pass filter is amplified to compensate for the power loss which occurs in the far range signal which is proportional to $1/R_4$ and also has an offset voltage applied to it from an offset voltage generator 11. The output from the low pass filter 8 and the output from the operational amplifier 10 are compared with one another in a further operational amplifier 12 forming a comparator. The output of this is high or low depending upon which of its inputs is the greatest. The limiting amplifier 6 removes large radar reflection returns which could upset the balance of the system.

The radar apparatus has an elevation controller including a stepping motor 13 which controls the elevation of the radar apparatus. The output from the comparator 12 is used to control the operation of the stepper motor 13 so that it is driven in one sense by a high output from the comparator 12 and in the opposite sense by a low output from the comparator 12. This means that under perfectly stationary conditions the elevation stepper motor 13 hunts about the correct position. However, if the comparison of the far range and near range echoes shows that the radar elevation is too great or too little the output from the comparator 12 causes the stepper motor 17 to compensate for this and so take account of any changes in the local terrain. The offset voltage applied by the offset voltage generator 11 ensures that if the elevation is too great so that the radar is pointing skyward and no echo is returned during either the initial period or the following period, an input is provided to the comparator 12 to provide an output which drives the stepper motor 13 to cause the elevation of the radar to be reduced. The time periods over which the radar echoes are monitored tend to average out the signal and thus any large radar cross-section which is encountered does not significantly affect its elevation control. Further, the low pass filters 7 and 8 which are preferably arranged to match the time constant of the elevation stepping motor 13 which is typically 250 Hz, also tend to average out the echoes over the time periods so that the power received is simply an indication of the distance from which the echoes are received.

The system provides a completely closed loop control system relying upon electronics that tend to be cheaper, and very much lighter than a conventional gyro stabilizing system. Since the system is a completely closed loop system non-linearities, backlash in any mechanical system of the elevation controller and radar boresight errors are all eliminated.

I claim:

1. A method of stabilizing the elevation of an air-to-ground radar mounted on an airborne platform, comprising the steps of:

transmitting a single radar scan from said air-to-ground radar;

first monitoring, during an initial period after said transmitting of said radar scan, a power of a first returning radar echo from said single radar scan;

second monitoring, during a following period after said initial period, a power of a later returning radar echo from said single radar scan;

comparing said power of said first returning radar echo with said power of said later returning radar echo; and controlling the elevation of said air-to-ground radar with respect to said platform on which it is mounted in accordance with the result of said comparison between said powers of said first and later returning radar echoes from said single radar scan in a way to stabilize the angle of incidence of the radar scan on the ground.

2. The method of claim 1, wherein in the event that said power of said returning radar echo during said initial period predominates over said power of said returning radar echo during said following period, said elevation of said air-to-ground radar is increased, and wherein in the event that said power of said returning radar echo during said following period predominates over said power of said returning radar echo during said initial period, said elevation of said air-to-ground radar is lowered.

3. A method as in claim 1 wherein said transmitting step is done at a first time t0, said first monitoring step is done from a time t1, after said time t0, to a time t2, after said time t1, said second monitoring step is done from said time t2 until a time t3, and further comprising the additional step of repeating said transmitting a single pulse scan step at a time t4 which is after said time t3, followed by repeating said first monitoring, second monitoring, comparing and controlling steps.

4. An air-to-ground radar including:

an elevation controller for controlling an elevation at which a radar scan transmitted from said air-to-ground radar is projected;

first power signal means for providing a first power signal representative of a power of a first returning radar echo from one radar scan occurring during an initial period after a transmission of said radar scan;

second power signal means for providing a second power signal representative of a power of a later returning radar echo from said one radar scan, occurring during a following period after said initial period; and comparator means operatively connected to said first power signal means, said second power signal means and said elevation controller, for comparing magnitudes of said first and second power signals and outputting a control signal to said elevation controller, said control signal causing said elevation controller to raise or lower said elevation at which said output radar pulses are projected in accordance with the result of said comparison between said first and second power signals in a way to stabilize an angle of incidence of the ground.

5. The air-to-ground radar of claim 4, wherein said second power signal means includes amplifier means for amplifying the magnitude of the power of said returning radar echo occurring during said following period to compensate for the greater loss expected from the returning radar echoes returning from a further range.

6. The air-to-ground radar of claim 5, which also includes biasing means operatively connected to said amplifier means to cause said elevation controller to lower said elevation at which said transmitted radar pulses are projected in the absence of both of said first and second power signals.

7. The air-to-ground radar of claim 6, wherein said amplifier means is an operational amplifier having two input terminals of the same sense, said second power signal being coupled to one of said input terminals, and wherein said biasing means generates an offset voltage and is operatively connected to the other of said input terminals of said operational amplifier.

8. The air-to-ground radar of claim 4, which also includes biasing means operatively connected to said comparator means to cause said elevation controller to lower said elevation at which said transmitted radar pulses are projected in the absence of both of said first and second power signals.

9. The air-to-ground radar of claim 4, wherein both said first and second power signal means include low pass filter means for averaging said first and second power signals.

10. The air-to-ground radar of claim 9, which includes limiting amplifier means operatively connected upstream of said first and second power signal means, said limiting amplifier means removing exceptionally large returning radar echoes before said first and second power signals are averaged in said low pass filter means.

11. The air-to-ground radar of claim 4, wherein said elevation controller includes a stepping motor.

12. A radar as in claim 4 wherein said one radar scan is transmitted at a time t0, said first power signal means operates from a time t1, after said time t0, until a time t2 after said time t1, and said second power signal means operates from said time t2 until a time t3, further comprising means for transmitting said one radar scan at said time t0 and for transmitting a subsequent radar scan at a subsequent time t4 which is after said time t3.

* * * * *